Patented Apr. 20, 1943

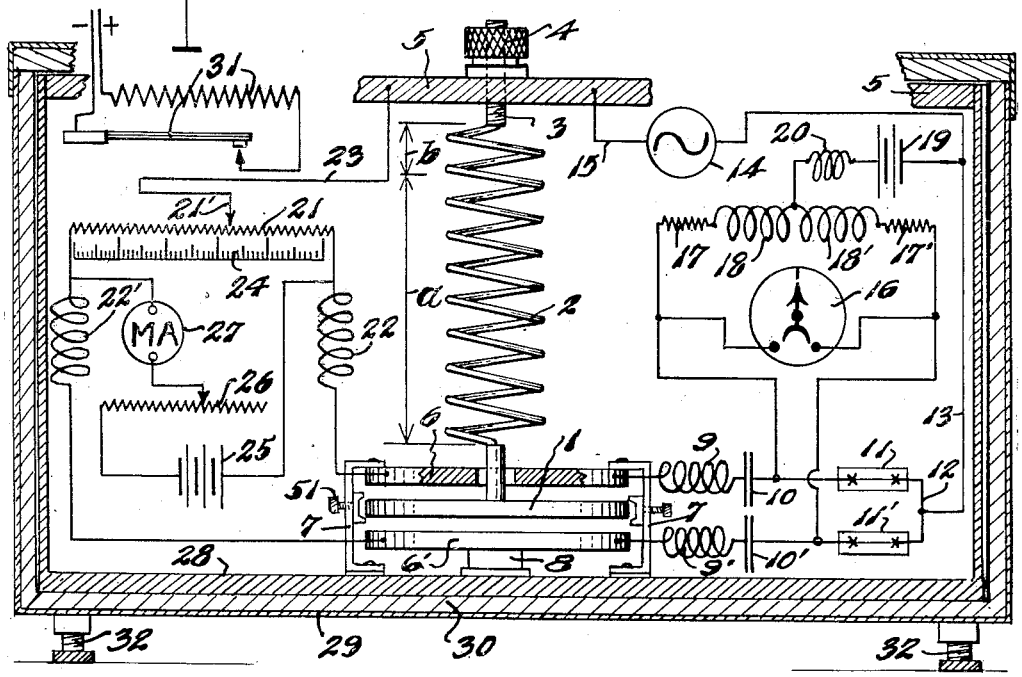
Fig. 1.
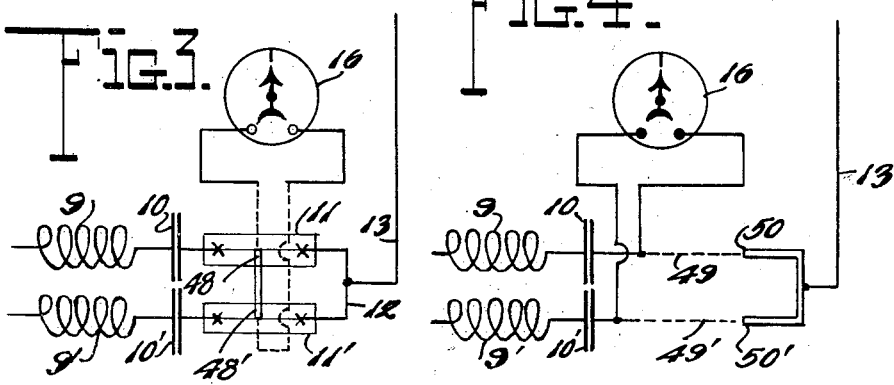
Fig. 3.   Fig. 4.
Inventor
O. H. Truman
By Robert Cobb
Attorneys

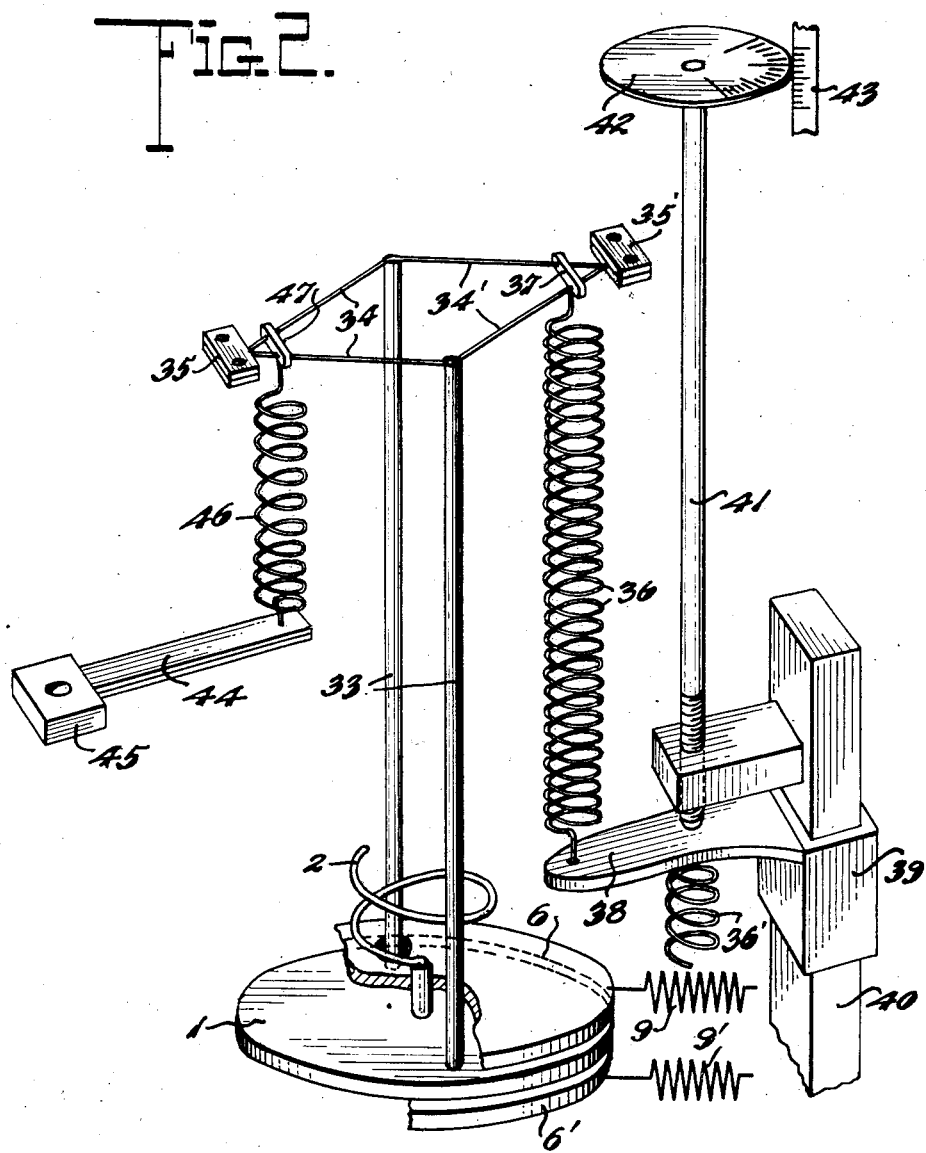

2,316,915

UNITED STATES PATENT OFFICE 2,316,915

APPARATUS FOR AMPLIFYING AND MEASURING SMALL DISPLACEMENTS

Orley H. Truman, Salt Lake City, Utah

Application October 12, 1939, Serial No. 299,205

12 Claims. (Cl. 265—1.4)

This invention appertains to an improved method of and apparatus for amplifying and measuring small motions or displacements, and more especially to the conversion or translation of imperceptible or infinitesimal motions or displacements into energy, preferably electrical, which may be accurately measured by means of instrumentalities that are available in the present day arts.

While the invention has many practical applications, as will become readily apparent as the description proceeds, it finds one of its most important uses in the field of so-called gravity meters. It is to be understood at the outset, however, that the invention is by no means confined to gravity meters, and that all reference herein to gravity meters is to be taken simply as illustrative of one practical application of the invention and as an aid to a clear understanding of the underlying principles thereof.

Gravity meters are sometimes used in geophysical prospecting, and serve to measure variations of the force of gravity. As far as I am aware, the gravity meters heretofore proposed or employed are not as reliable as desired for practical purposes, and are otherwise inaccurate and inadequate, with the result that they have met with small degree of success. This is quite understandable when it is borne in mind that in practice it is necessary to measure the force of gravity to one part in ten million. Let it be assumed that a weight is suspended by a spring having a total stretch of five inches. A change in the force of gravity will cause the weight to rise or fall in proportion to the change, but the rise or fall will be imperceptible and exceedingly minute (on the order of one two-millionth of an inch). It thus becomes necessary to amplify or magnify this minute displacement, until it is either directly visible or converted into some visible or otherwise ascertainable unit of measurement.

My invention primarily has to do broadly with a practical method and means for magnifying and measuring such minute displacements, and, in addition to those displacements produced by variations in gravity, the invention is applicable, for example, to small displacements such as are produced by thermal expansion, bending, tension or compression stresses, and the like. The degree of amplification afforded by the invention is far greater than that produced by any instrument for similar purposes of which I am aware.

I have found that an electrical method and apparatus fulfill the purposes to a very satisfactory degree, particularly because of their simplicity of construction and operation, ruggedness and dependability even under conditions of rough handling and other unfavorable conditions, high sensitivity, compactness of form, and adaptability to compensation for extraneous factors which are reduced to a minimum in such a system. The measuring instrumentalities are easy to read even under unfavorable light conditions and without special magnifying optical appliances, and may be composed of few mechanical parts which are not likely to get out of order, and which may be arranged so that they are readily accessible. On the other hand, a combination of electrical and mechanical principles may be equally well suited, as will hereinafter more fully appear.

It is well known that in an alternating current circuit embodying inductance, capacitance, and resistance, there is a certain resonant frequency near which the current flow in the circuit varies greatly with small changes in the capacitance of the circuit, particularly if the resistance is kept low. This peculiar characteristic of resonant circuits is especially applicable to my invention, since by varying the capacitance of the circuit responsive to the displacement to be measured, the displacement will be translated into electrical energy and greatly amplified so that it can be readily detected and accurately measured either electrically or mechanically.

In some cases where the range of variations in displacement is small, the current flow in the resonant circuit above referred to may be satisfactorily measured by an instrument such as a galvanometer, preferably calibrated in suitable units of displacement. Where the range of such an instrument is inadequate, as where a substantially wide range of displacement variation is encountered, resort may be had to an indirect measurement by a force applied electrically or mechanically in opposition to that producing the displacement which is to be measured, until the current in the resonant circuit is normalized or otherwise restored to a predetermined value. The amount of the opposing force will, of course, be the measure of the displacement, and the means by which the opposing force is applied may be readily calibrated in suitable units of displacement. In each case, the displacement to be measured produces a flow of electrical energy in a resonant circuit embodying a movable indicator element, the movement of which is effectively amplified many fold as compared with the actual displacement itself, and to a degree which is readily measurable as a function of the displace- Other and further objects and advantages of the invention will be hereinafter described and the novel features thereof defined by the appended claims.

In the drawings:

Figure 1 is a diagrammatic view of an electrical system for practicing my improved method of amplifying and measuring displacements, the same being shown in an organization applicable as a gravity meter, for convenience of illustration of one practical application of the system;

Figure 2 is a fragmentary view of modified forms of weight suspension and mechanical balancing instrumentalities, either of which may be substituted for the simpler suspension and electrical (potentiometer) balancing instrumentalities, respectively, shown in Figure 1;

Figure 3 is a fragmentary detail view of a modified form of galvanometer or bridge circuit of the thermal responsive type employing thermocouples, which may be substituted for the galvanometer or bridge circuit shown in Figure 1; and Figure 4 is a fragmentary detail view of another modified form of galvanometer or bridge circuit employing thermocouples in a manner somewhat different from that shown in Figure 3.

Like reference characters designate corresponding parts in the several figures of the drawings, wherein 1 denotes a weight suspended by a spring 2, which, in turn, is suspended by an adjusting screw 3 and nut 4 supported by a fixed support 5. The weight 1 preferably has the form of a flat metal disc which, ordinarily, should be about three inches in diameter. The spring 2 is preferably made of material which is substantially unaffected by temperature changes. Thus, if the spring 2 is sufficiently constant in its elasticity, it will stretch to an amount proportional to the force of gravity, and the weight 1 will rise or fall in proportion to variations of the force of gravity. The displacement of the weight 1 can best be accurately measured by the utilization of the weight as a variable capacitance element, or as the operating medium of a variable capacitance in a resonant circuit, and, to this end, there is provided a pair of spaced metal discs 6, 6′, each of which is generally similar to the disc 1. These discs 6, 6′ are suitably fixedly mounted, one above and one below the weight or disc 1, by means of insulated supports, such as 7, 8. Connected to the respective discs 6, 6′ are radio frequency inductance coils 9, 9′, and fixed condensers 10, 10′, the latter in turn being connected to resistance elements generally designated 11, 11′, which will hereinafter be more fully described. The resistance elements 11, 11′ are connected together by a common conductor 12, thus forming a resonant circuit in which the fixed discs 6, 6′ and intermediate movable weight 1 constitute a variable capacitance. The common conductor 12 is connected by a conductor 13 to one side of a radio frequency generator generally designated 14, and the other side of the generator 14 is connected by a conductor 15 to the support 5 to complete the circuit through the screw 3 and spring 2 to the weight 1, these latter elements being in electrical conductive relation to each other. The inductance coils 9, 9′ should be nearly alike as possible, and are preferably designed so as to have low resistance. They are best wound with Litz wire, and particular care should be taken to reduce losses in the various ways well known to those skilled in the art. The fixed condensers 10, 10′ are likewise preferably identical with each other and of sufficient capacity so that their impedance is negligible.

According to the principle of resonant circuits, it will be understood that if the weight 1 is equally spaced between the discs or plates 6, 6′, the currents flowing through the two branches of the circuit and composed of the coil 9, fixed condenser 10, and resistance element 11, and coil 9′, fixed condenser 10′, and resistance element 11′, respectively, will be equal. However, if the weight 1 should rise or sink with respect to its normal mid-position, the currents in the branches of the resonant circuit will become unequal, and very much so if the frequency of the generator 14 is chosen near (slightly above or slightly below) the resonant frequency of the circuit, either of which two chosen frequencies may be arrived at by trial as indicated by the greatest sensitivity of the circuit. This inequality of the current flow in the branches of the resonant circuit may be conveniently utilized as an accurate measure of the displacement of the weight 1, and it simply remains to detect the difference in the currents.

For this purpose, I preferably employ the principle of the bolometer. The resistance elements 11, 11′, are thus made of some material, the resistance of which changes rapidly with changes in temperature. Iron is a good example of such a material. I have found that iron wires of about 0.0015 inch in diameter and about one inch long give excellent results in practical use. These wires should be accurately adjusted to be of the same resistance at the same temperature, and are preferably placed in a vacuum of about 0.001 mm., as this not only protects them from oxidation, but increases the sensitivity about one hundred fold.

The resistance elements 11, 11′, each composed of one of the fine iron wires above referred to and hereinafter called the "hot" wires, are connected in a bridge circuit composed of a galvanometer 16, coils 17, 18, 18′, 17′, and battery 19. Actually, 17 represents the resistance of the inductance coil 18, and 17′ represents the resistance of the inductance coil 18′, the two inductance coils being preferably made of enameled copper wire and wound one on top of the other on the same form, so as to be in intimate thermal contact, and to always be at the same temperature. The coils are made of equal lengths of wire so that the resistances 17, 17′ are equal, and it is simplest to make them also equal to the resistances of the hot wires 11, 11′, which is normally about 2 ohms. The coils 18, 18′ are so connected that their inductances assist each other, so that to radio frequency currents attempting to flow through from 17 to 17′, they constitute a radio frequency choke, and practically no radio frequency currents will flow through this part of the bridge circuit. When the coils 18, 18′ are so connected as just described, their inductive impedance to radio frequency currents attempting to flow through the battery 19 will be zero. It will, therefore, be necessary to include a radio frequency choke 20 between the battery 19 and the interconnected ends of the coils 18, 18′, to prevent this, unless, which will usually be the case, an auxiliary resistance at that point itself serves to keep the bridge current low enough. The inductance of the galvanometer 16 will be high enough to prevent radio frequency currents from passing through the galvanometer, and, consequently, the radio frequency currents are confined to the resonant circuit, as previously described. The fixed condensers 18, 18' in the resonant circuit keep the direct currents from flowing to the plates or discs 6, 6'. Consequently, the bridge works without interference and constitutes a delicate means of detecting any difference of the currents in the resistance elements 11, 11', and so of any displacement of the disc or plate 1. In fact, even with the hot wires in air, and a moderately sensitive portable galvanometer of about 20 mm. displacement per microampere, I have been able to attain galvanometer deflections of six to seven mm. for a capacity change in the resonant circuit equivalent to one ten-millionth part of gravity. With the hot wires submerged in vacuum, it is even possible to use a galvanometer of the inferior pivot type and still have all the sensitivity desired. Changes of gravity as small as one ten-millionth part, or even less, will thus be indicated plainly by the deflection of the galvanometer, and the reading of the galvanometer can be taken as an index of those changes and translated or calibrated directly into terms of gravity or other suitable units of displacement, particularly where the total changes of gravity are small.

Ordinarily, when employing my invention in a gravity meter, the changes of the force of gravity will frequently be great enough to deflect the galvanometer entirely off the scale. Under such circumstances, it is advisable to have some means by which an extra and known force is applied to the weight or disc 1 to restore it to a certain normal position, as evidenced by a certain normal galvanometer reading, and to use that force as a measure of the force of gravity or displacement. One practical way of doing this is shown at the left in Figure 1, the same being based entirely upon electric methods in harmony with the electric principles hereinbefore described. 21 designates a potentiometer, the opposite ends of which are respectively connected to radio frequency choke coils 22, 22' which, in turn, are respectively connected to the fixed discs or plates 6, 6'. The center tap 21', which is movable, is connected to the support 5, and so to the weight or disc 1, by a conductor 23, and the setting of the tap 21' can be read by a scale 24. The opposite ends of the potentiometer are connected to a battery 25 (which, in practice, may be the same as battery 15), the purpose of which is to cause a direct current to flow through the potentiometer. Provision is preferably made for adjusting this current to any desired value, and, for this purpose, a variable resistance 26 and a milliammeter 27 are interposed between the battery 25 and the potentiometer. The effect of this is to keep the two fixed discs or plates 6, 6' at D. C. potentials which differ equally from that of the center plate or weight 1, when the latter is in its midposition between the discs 6, 6', in which case the weight 1 will be subjected to equal attractions in an upward and downward direction. If, however, the movable center tap 21' of the potentiometer be shifted from its midposition, there will be unequal forces of attraction imposed upon the weight 1, in ascertainable proportion to the setting of the potentiometer. By adjusting the potentiometer setting until the galvanometer 16 is brought to a normal or predetermined reading, the setting of the potentiometer will indicate the force of gravity. Once the potentiometer scale 24 is calibrated in terms of gravity changes, it will remain so. The initial calibration can be readily performed by placing a small weight, having a known ratio to the weight 1, upon the latter, and noting the amount of potentiometer change required to balance it.

The radio frequency choke coils 22, 22' serve to keep the radio frequency currents in the resonant circuit from passing through the potentiometer or battery 25 and milliammeter 27, while the fixed condensers 18, 18' in the resonant circuit serve to keep the D. C. currents from the galvanometer or bridge circuit from passing to the potentiometer circuit.

It is evident that the potentiometer should be of a thoroughly reliable type, wound with wire which does not vary its resistance appreciably with variation of temperature, and should be capable of a continuous variation of settings, rather than by steps. Such potentiometers are well known and available on the market. The advantage of this potentiometer method of measurement of gravity variations or displacements in general is that it requires no extra mechanical parts in the main portion of the instrument.

It will generally be desirable to place the core of the instrument, that is, the weight 1, spring 2, and all associated parts, in an air-tight case 28 preferably made of heavy metal, such as aluminum, which is a good conductor of heat, whereby to maintain a constant temperature from point to point of the apparatus. This case 28 may also be enclosed in an outer insulated temperature case 29, the insulation being generally designated 30, and, if desired, a constant temperature may be maintained within the case by means of a thermostat generally designated 31. Thus, the apparatus will be protected from the effects of varying atmospheric pressure and temperature.

In the use of the apparatus, the weight or disc 1 should be maintained substantially level or horizontal, and the levelling may be accomplished with the aid of suitable levelling screws 32, which are preferably adjusted before each observation, in association with some suitable levelling instrument, such as spirit level. Where it is impractical or undesirable to spare space enough to employ a spring 2, which is of sufficient length to cause the weight 1 to be suspended parallel to the plates 6, 6' of its own accord, and to minimize any likelihood of instability resulting from the electrical attractions between the plates or discs when employing the potentiometer normalizing method of measurement, resort may be had to a modified form of suspension, as illustrated in Figure 2. According to this modified construction, the weight or disc 1 is provided with stems 33, preferably two in number, which extend upwardly therefrom for a substantial distance perpendicular to the disc. The upper ends of these stems are attached to small wires or ribbons 34, 34', which, in turn, are anchored to fixed clamping blocks 35, 35', which are adapted to be attached to the support 5, or other fixed part of the frame of the apparatus. These wires 34, 34' serve to maintain the upper ends of the stems 33 in the same vertical plane, while at the same time allowing the slight vertical movement of the stems and weight 1, as contemplated according to the normal operation of the weight, as previously described. Thus, when the instrument has been levelled in the manner above referred to, the weight 1 will be held horizontal with all the accuracy required.

In lieu of the potentiometer method of measurement illustrated in Figure 1, a mechanical method may be employed, such method being illustrated in Figure 2. According to this arrangement, a very weak spring 36 is connected at its upper end to the wires 34' in any suitable manner, as by means of a small cross-piece or spreader 37, and the lower end of the spring is connected to the arm 38 of a slide 39 which is movable upwardly and downwardly on a guide bar 40 against the pressure of an opposing spring 36'. Movement of the slide 39 may be effected by a micrometer screw 41, bearing at its lower end upon the arm 38 and having a calibrated dial 42 at its upper end, cooperating with a scale 43. The dial and scale are located outside of the instrument case and may be calibrated directly in terms of gravity by means of an auxiliary weight, as described in the calibration of the potentiometer scale 24.

The spring 36 could, of course, be attached directly to the weight or disc 1, but in such a case the spring would have to be finer and more delicate than is desirable or practicable. By utilizing the manner of attachment as just described, the force of the spring 36 is applied to the weight 1 through what is virtually a lever, thereby reducing the force appreciably, and permitting the use of a suitably large and rugged spring.

It will be understood that the effect of the spring 36 is to normalize the capacitance of the resonant circuit, as indicated by normalizing the reading of the galvanometer 16, comparable to the effect produced by the potentiometer method of normalization. The normalizing force is applied to the weight 1 through the spring 36 by rotation of the micrometer screw 41 in one direction or the other, according to the displacement of the weight 1 in an upward or downward direction responsive to the change in the force of gravity to be measured.

As a further manner of compensating for the effects of changes in temperature upon the main spring 2, and, to a lesser extent, upon other parts of the apparatus, the major portion of the spring represented by line a in Figure 1 may be composed of a metal which slightly increases its elastic stretch with increasing temperature, and a much smaller portion b, of some material as steel, which decreases its elastic strength with increasing temperature. By proper proportioning of these parts a and b, the total temperature effect can be reduced to a minimum.

Another form of temperature compensator is illustrated in Figure 2, wherein 44 designates a bimetallic strip clamped in a fixed block 45 which may be attached to the supporting frame or case of the instrument. The free end of the bimetallic strip 44 is operatively connected to the suspension wires 34 so as to impart the compensating movements of the bimetallic strip to the weight or disc 1. In practice, to avoid making the bimetallic strip inconveniently small, it will often be best to make it larger and then connect it to the bottom of a weak spring 46, the upper end of the spring being in turn connected to a cross-piece or spreader 47 carried by the wires 34, thereby reducing the compensating effect of the bimetallic strip. This compensating effect is also further reduced by the leverage afforded by the wires 34, until, on the whole, it is as small as it need be.

While the bolometer principle hereinbefore referred to is perhaps the most sensitive way of measuring the difference in the currents in the hot wires 11, 11' of the resonant circuit, other means may be satisfactorily employed, especially where the degree of sensitivity required is not so great. In Figure 3, I have illustrated a modified form of bridge or galvanometer circuit which operates on a thermal responsive principle, the resonant circuit being the same as before, excepting that the resistance elements or hot wires 11, 11' are made of any metal which heats readily and without injury by the electrical current. Two opposed thermocouples 48, 48' are connected to the galvanometer 16, and the thermocouples are placed in thermal contact with the hot wires 11, 11', but electrically insulated therefrom. The hot wires 11, 11' and thermocouples are preferably put into a vacuum to avoid loss of heat, and a consequent loss of sensitivity.

Another modified form of galvanometer or bridge circuit is illustrated in Figure 4, also employing thermocouples but in a manner somewhat different from that illustrated in Figure 3. Here the thermocouples are their own heaters. Each of the thermocouples 49, 49' is connected to the galvanometer 16. The portions of each thermocouple to the right of the respective junctions 50, 50', symbolized by the solid heavy lines, are made of one metal, and the portions to the left of the respective junctions 50, 50', symbolized by the dotted lines, are made of a different metal. The junctions 50, 50' are heated by the different radio frequency currents passing through them, and the difference of their temperatures is indicated by the galvanometer. This arrangement will be substantially twice as sensitive as the arrangement shown in Figure 3, because there will be less wires to carry off heat from the thermo junctions.

One of the important advantages of measuring instruments constructed in accordance with my invention is the fact that it is unaffected by ground vibration. This is partly due to the use of the hot wires 11, 11', which, when made of the size hereinbefore suggested, accommodate themselves to changes of temperature fast enough for purposes of reading the instrument, but too slowly to follow ground vibrations. In addition, the spacing of the discs 6, 6' and weight 1 will be small enough to provide heavy damping, by reason of the resistance of the air which must flow in and out between them. So far as the electrical considerations are concerned, a considerable latitude of choice of the spacing is available. While it would seem at first sight that the spacing should be extremely small to afford high sensitivity, this is fortunately not necessary. For as this spacing is increased, the current flow of the radio frequency currents can be increased along with it. As these currents are increased, the potential between the movable plate and the fixed plates, and the resulting attraction, also increase, and the currents must be kept low enough so that, as found by calculation, this attraction, with its possible variations through variations of the current, does not become too large a fraction of the force of the spring 2. However, it proves that up to a certain point, far outside of practical needs, an increase of the spacing, which decreases the sensitivity, can be more than made up by a permissible increase of the radio frequency currents, and so that excessively small spacing is not necessary. Thus, the distance between the discs may be at least 0.01 inch, so far as the electrical considerations are concerned, while at the same time affording the desired degree of damping.

By means of the nut 4, which will preferably be arranged so as to be available from the outside of the cases in which the instrument is enclosed, the height of the disc or weight 1 may be roughly adjusted either in putting the instrument in order in the first place, or to adapt it to differences of gravity in wholly different regions. A suitable clamping device, many forms of which will be obvious to those skilled in the art, is preferably provided to clamp the weight or disc 1, when not in use, in a position near to what it will occupy when hanging free. In Figure 1, I have generally illustrated one form of screw clamp, designated 51, which may be satisfactorily utilized, but it is to be understood that other forms may be used if preferred. This avoids falsifying of the readings of the instrument due to elastic after-effects.

While the specific details have been herein shown and described, the invention is not confined thereto, as changes and alterations may be made without departing from the spirit thereof as defined by the appended claims.

What I claim as new and desire to secure by Letters Patent is:

1. In apparatus for amplifying and measuring minute displacements, the combination of an electrical resonant circuit which includes a capacitance which is variable in response to the displacement to produce a current flow in said circuit which is a function of the displacement, and a potentiometer circuit operatively connected with the capacitance of the resonant circuit for normalizing the capacitance of the latter circuit, said potentiometer circuit including means for measuring the normalizing effect thereof as a function of the displacement.

2. In a gravity meter, a plate, a spring for yieldably suspending said plate for movement in an upward and downward direction responsive to changes in the force of gravity, a pair of electrical circuits each including a fixed plate, said fixed plates being respectively disposed above and below said movable plate in capacitative relation thereto with each of the fixed plate circuits forming a resonant circuit, a radio frequency electrical generator supplying a current of frequency near the resonant frequency of said circuits and being operatively connected with the fixed plate circuits aforesaid and with the movable plate so that the movement of the movable plate changes the capacitance of the fixed plate circuits to produce a current flow in the circuits in proportion to the change of capacitance, and means for measuring the current flow aforesaid as a function of the displacement of the movable plate and consequently as a function of the varying force of gravity.

3. In a gravity meter as claimed in claim 2, wherein the last-mentioned means includes a bolometer wire disposed in each plate circuit.

4. In a gravity meter as claimed in claim 2 wherein the last-mentioned means includes a thermocouple operatively connected into each resonant circuit.

5. Apparatus for detecting and measuring small displacements comprising, in combination, a pair of substantially resonant tuned circuits, means responsive to a displacement for varying in opposite senses the current flow in the respective circuits, thermally responsive means including a bolometer wire operatively connected into each of the respective circuits, said last-named means being responsive to current flow in the respective circuits, and measuring means for determining the differences in responses of the thermally responsive means.

6. Apparatus for detecting and measuring small displacements comprising, in combination, a pair of substantially resonant tuned circuits, means responsive to a displacement for varying in opposite senses the current flow in the respective circuits, thermally responsive means in the respective circuits, including a bolometer wire operatively connected into each circuit, and means including a Wheatstone bridge for measuring the differences in responses of said thermally responsive means.

7. Apparatus for detecting and measuring small displacements comprising, in combination, a pair of substantially resonant tuned circuits, means responsive to a displacement for varying in opposite senses the current flow in the respective circuits, thermally responsive means in the respective circuits, including a thermocouple operatively connected into each circuit, and means for measuring the differences in temperature responses of the said thermocouples.

8. Apparatus for detecting and measuring small displacements comprising, in combination, a pair of substantially resonant circuits each having a variable capacitance element, and a plate in juxtaposition to said elements, said elements and plate being relatively movable in response to a displacement whereby to vary the capacitances in the respective circuits in opposite senses, electrical means for applying an opposed, normalizing force to the capacitances, thermally responsive means in the respective circuits and being responsive to current flow therein, measuring means operatively associated with the last-named means whereby to determine when said capacitances become normalized, and means for measuring the normalizing force.

9. Apparatus as claimed in claim 8 wherein the means for applying an opposed, normalizing force includes a potentiometer circuit.

10. Apparatus as claimed in claim 8 wherein the means for applying an opposed, normalizing force includes a potentiometer circuit and wherein the means for measuring said force includes a galvanometer.

11. In apparatus for amplifying and measuring minute displacements, a plate, a spring for yieldably suspending said plate for movement in an upward and downward direction responsive to changes in the displacement to be measured, a pair of fixed plates, one of which is arranged above and the other of which is arranged below the movable plate in capacitive relation thereto, said fixed plates each being arranged in an electrical circuit, and the electrical circuits aforesaid being interconnected in the form of resonant circuits respectively controlled as to capacitance by the movable plate, a source of radio frequency current, the frequency of which is near the resonant frequency of the resonant circuits aforesaid, operatively connected to the fixed and movable plates so that variations of the position of the movable plate serve to vary the current flow in the respective fixed plate circuits, means responsive to the variation of current in the fixed plate circuits for indicating the latter current variations as a function of the changes in the displacement being measured, and adjustable means acting upon the movable plate for normalizing the same in opposition to the displacement aforesaid as a measure of the change in the displacement.

12. In apparatus for amplifying and measuring minute displacements, a plate, a spring for yieldably suspending said plate for movement in an upward and downward direction responsive to changes in the displacement to be measured, a pair of fixed plates, one of which is arranged above and the other of which is arranged below the movable plate in capacitive relation thereto, said fixed plates each being arranged in an electrical circuit, and the electrical circuits aforesaid being interconnected in the form of resonant circuits respectively controlled as to capacitance by the movable plate, a source of radio frequency current, the frequency of which is near the resonant frequency of the resonant circuits aforesaid, operatively connected to the fixed and movable plates so that variations of the position of the movable plate serve to vary the current flow in the respective fixed plate circuits, means responsive to the variations of current in the fixed plate circuits for indicating the latter current variations as a function of the changes in the displacement being measured, and adjustable means acting upon the movable plate for normalizing the same in opposition to the displacement being measured as a measure of the change in the displacement aforesaid, said adjustable means comprising a potentiometer circuit connected with the movable and fixed plates of the resonant circuits so as to establish an electrical field acting upon the movable plate in proportion to the current flow in the potentiometer circuit.

ORLEY H. TRUMAN.